US009286920B1

(12) United States Patent
Hu et al.

(10) Patent No.: US 9,286,920 B1
(45) Date of Patent: Mar. 15, 2016

(54) METHOD FOR COMPENSATING FOR PHASE VARIATIONS IN AN INTERFEROMETRIC TAPERED WAVEGUIDE IN A HEAT ASSISTED MAGNETIC RECORDING HEAD

(71) Applicant: Western Digital (Fremont), LLC, Fremont, CA (US)

(72) Inventors: Yufeng Hu, Fremont, CA (US); Ut Tran, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 3 days.

(21) Appl. No.: 13/756,379

(22) Filed: Jan. 31, 2013

(51) Int. Cl.
*G11B 7/00* (2006.01)
*G11B 5/00* (2006.01)
*G11B 5/31* (2006.01)
*G11B 7/1384* (2012.01)
*G11B 7/22* (2006.01)

(52) U.S. Cl.
CPC ............. *G11B 5/3163* (2013.01); *G11B 5/314* (2013.01); *G11B 7/1384* (2013.01); *G11B 7/22* (2013.01); *G11B 2005/0021* (2013.01)

(58) Field of Classification Search
CPC .................. G02B 2006/12159; G02B 6/12007; G02B 6/1226; G02B 6/125; G02B 6/13; G11B 2005/0021; G11B 5/314; G11B 13/08; G11B 7/1387; G01N 2021/7703; G01N 2021/7713; G01N 2021/7716; G01N 21/7743; G01N 21/7746; G01N 2021/4166; G01N 2021/458
See application file for complete search history.

(56) References Cited

U.S. PATENT DOCUMENTS

| 5,173,909 A | 12/1992 | Sakano et al. |
|---|---|---|
| 5,199,090 A | 3/1993 | Bell |
| 5,341,391 A | 8/1994 | Ishimura |
| 5,495,548 A | 2/1996 | Bilodeau et al. |
| 5,832,155 A | 11/1998 | Rasch et al. |
| 5,960,014 A | 9/1999 | Li et al. |
| 6,221,566 B1 | 4/2001 | Kohnke et al. |
| 6,275,453 B1 | 8/2001 | Ueyanagi et al. |
| 6,671,127 B2 | 12/2003 | Hsu et al. |
| 6,687,195 B2 | 2/2004 | Miyanishi et al. |

(Continued)

FOREIGN PATENT DOCUMENTS

| EP | 1498878 A2 | 1/2005 |
|---|---|---|
| EP | 1501076 A1 | 1/2005 |

OTHER PUBLICATIONS

Chen-Fu Chu, et al., "Study of GaN light-emitting diodes fabricated by laser lift-off technique", Journal of Appl. Phys., vol. 95, No. 8, Apr. 15, 2004, pp. 3916-3922.

(Continued)

*Primary Examiner* — Dionne H Pendleton

(57) ABSTRACT

A method fabricates an interferometric tapered waveguide (ITWG) for a heat-assisted magnetic recording (HAMR) transducer. The ITWG is defined from at least one waveguide layer. The waveguide layer(s) include an energy sensitive core layer. The energy sensitive core layer has an index of refraction that varies in response to exposure to energy having a particular wavelength range. The step of defining the ITWG includes defining a plurality of arms for the ITWG. At least one phase difference between the arms is determined. At least one of the arms is exposed to the energy such that the index of refraction of the energy sensitive core layer in the arm(s) is changed and such that the phase difference(s) between the arms is changed.

18 Claims, 10 Drawing Sheets

(56) References Cited

U.S. PATENT DOCUMENTS

| | | |
|---|---|---|
| 6,795,630 B2 | 9/2004 | Challener et al. |
| 6,834,027 B1 | 12/2004 | Sakaguchi et al. |
| 6,842,544 B2 | 1/2005 | Eldada |
| 6,975,580 B2 | 12/2005 | Rettner et al. |
| 7,027,700 B2 | 4/2006 | Challener |
| 7,042,810 B2 | 5/2006 | Akiyama et al. |
| 7,071,492 B2 | 7/2006 | Li et al. |
| 7,170,368 B2 | 1/2007 | Eng |
| 7,171,080 B2 | 1/2007 | Rausch |
| 7,190,539 B1 | 3/2007 | Nibarger |
| 7,266,268 B2 | 9/2007 | Challener et al. |
| 7,272,079 B2 | 9/2007 | Challener |
| 7,319,047 B2 | 1/2008 | Li et al. |
| 7,330,404 B2 | 2/2008 | Peng et al. |
| 7,440,660 B1 | 10/2008 | Jin et al. |
| 7,486,709 B2 | 2/2009 | Hu et al. |
| 7,500,255 B2 | 3/2009 | Seigler et al. |
| 7,567,387 B2 | 7/2009 | Itagi et al. |
| 7,570,320 B1 | 8/2009 | Anderson et al. |
| 7,596,072 B2 | 9/2009 | Buechel et al. |
| 7,649,677 B2 | 1/2010 | Jin et al. |
| 8,077,557 B1 | 12/2011 | Hu et al. |
| 8,184,931 B2 | 5/2012 | Kanagawa et al. |
| 8,477,571 B1 * | 7/2013 | Zhou et al. ............... 369/13.33 |
| 8,670,294 B1 | 3/2014 | Shi et al. |
| 8,675,455 B1 | 3/2014 | Krichevsky et al. |
| 2001/0006435 A1 | 7/2001 | Ichihara et al. |
| 2001/0017820 A1 | 8/2001 | Akiyama et al. |
| 2003/0113064 A1 * | 6/2003 | Poladian et al. ............... 385/37 |
| 2003/0184903 A1 | 10/2003 | Challener |
| 2003/0198146 A1 | 10/2003 | Rottmayer et al. |
| 2004/0001394 A1 | 1/2004 | Challener et al. |
| 2004/0001420 A1 | 1/2004 | Challener |
| 2004/0008943 A1 * | 1/2004 | Berini ............... 385/39 |
| 2004/0027728 A1 | 2/2004 | Coffey et al. |
| 2004/0071380 A1 * | 4/2004 | Wiesmann et al. ............... 385/1 |
| 2004/0228022 A1 | 11/2004 | Ueyanagi |
| 2005/0047013 A1 | 3/2005 | Le et al. |
| 2005/0058425 A1 * | 3/2005 | Berini et al. ............... 385/147 |
| 2005/0078565 A1 | 4/2005 | Peng et al. |
| 2005/0122850 A1 | 6/2005 | Challener et al. |
| 2005/0289576 A1 | 12/2005 | Challener |
| 2006/0205092 A1 * | 9/2006 | Lackritz et al. ............... 436/525 |
| 2007/0081426 A1 | 4/2007 | Lee et al. |
| 2007/0081427 A1 | 4/2007 | Suh et al. |
| 2008/0055343 A1 | 3/2008 | Cho et al. |
| 2008/0180827 A1 | 7/2008 | Zhu et al. |
| 2008/0181560 A1 | 7/2008 | Suh et al. |
| 2008/0198496 A1 | 8/2008 | Shimazawa et al. |
| 2008/0232225 A1 | 9/2008 | Cho et al. |
| 2010/0046879 A1 * | 2/2010 | Lee et al. ............... 385/2 |
| 2011/0235480 A1 | 9/2011 | Goulakov et al. |
| 2012/0020195 A1 | 1/2012 | Seigler |
| 2012/0039155 A1 | 2/2012 | Peng et al. |
| 2012/0087613 A1 | 4/2012 | Rasras |
| 2014/0133283 A1 * | 5/2014 | Maletzky et al. ............ 369/13.33 |

OTHER PUBLICATIONS

Chao-Yi Tai, et al., "UV Photosensitivity in a Ta2O5 Rib Waveguide Mach-Zehnder Interferometer", IEEE Photonics Technology Letters, vol. 16, No. 6, Jun. 2004, pp. 1522-1524.

Chubing Peng, "Surface-plasmon resonance of a planar lollipop near-field transducer", Applied Physics Letters 94, 171106 (2009), 3 pages.

Wang, et al., ""Thermo-optic properties of sol-gel-fabricated organic-inorganic hybridwaveguides"", J. Appl. Phys., vol. 94, No. 6, Sep. 15, 2003, pp. 4228-4230.

* cited by examiner

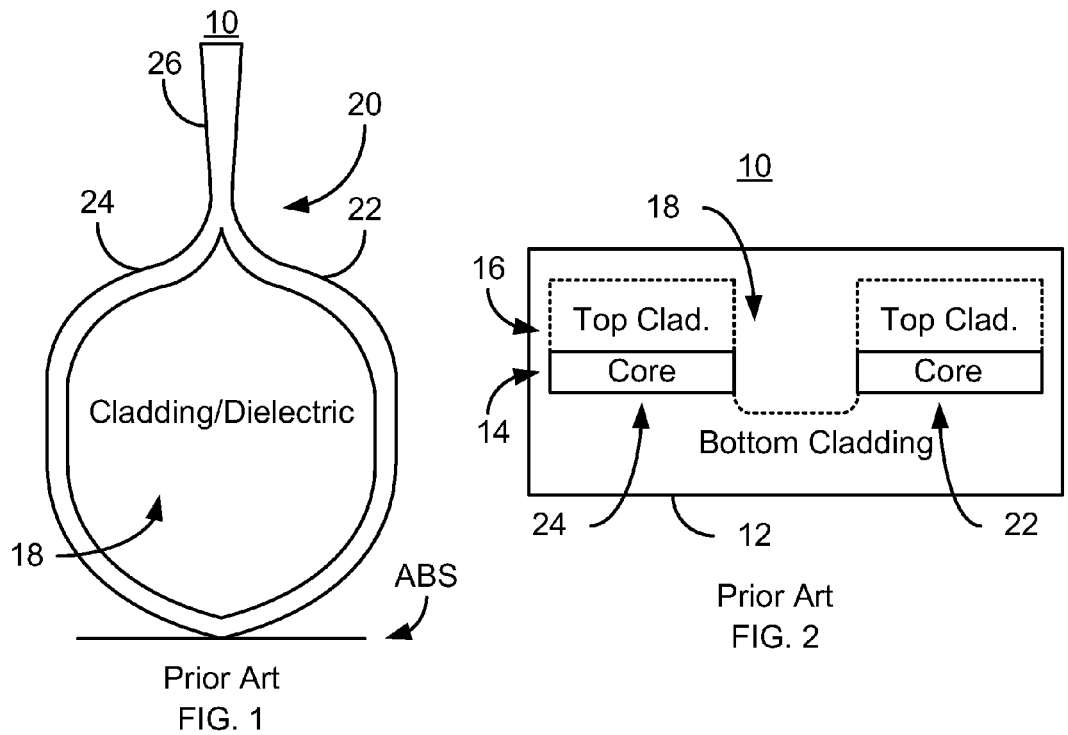

METHOD FOR COMPENSATING FOR PHASE VARIATIONS IN AN INTERFEROMETRIC TAPERED WAVEGUIDE IN A HEAT ASSISTED MAGNETIC RECORDING HEAD

BACKGROUND

FIGS. 1-2 depict plan and side views, respectively, of a portion of a conventional heat assisted magnetic recording (HAMR) transducer 10. The HAMR transducer 10 includes a pole (not shown), coil(s) (not shown), and other components used in writing to a media (not shown). The HAMR transducer 10 is coupled to a laser (not shown) for providing light energy to the HAMR transducer 10. In addition, the HAMR transducer includes a conventional interferometric tapered waveguide (ITWG) 60 for directing light from the laser to a near field transducer (NFT) near the ABS. The conventional ITWG 20 includes a bottom cladding layer 12, a core layer 14, and a top cladding layer 16. The core layer 14 is formed into arms 22 and 24 as well as tapered portion 26. In operation, light is coupled into the ITWG 20 and confined to a smaller mode in tapered region 26. The light is split into the arms 22 and 24. This is typically accomplished using a Y-splitter, as shown in FIG. 1, or a multimode interferometric (MMI) device.

At the ABS, light from the arms 22 and 24 of the ITWG 20 is out of phase. Each arm 22 and 24 is designed to have a different optical length. The differing optical lengths are due to differences in length, thickness and width of the arms 22 and 24. The arms 22 and 24 of the conventional ITWG 20 thus have an optical path difference. When the light from the arms 22 and 24 converges near the ABS, the light from the arm 22 is out of phase from the light from the arm 24 because of this optical path difference. Thus, the arms 22 and 24 have a phase difference. The target phase difference is the desired phase difference between light from the arms 22 and 24 at or near the ABS, for example at the NFT (not shown).

In operation, the conventional ITWG 20 directs light energy from the laser to the NFT (not shown). Light from the arms 22 and 24 having the target phase difference provides a desired interference pattern at the NFT. For example, for some HAMR transducers 10, the target phase difference is 180°. The NFT converts the electromagnetic energy in the interference pattern into surface plasmons at the NFT. The NFT then transfer this energy to a highly localized field, and thus a small spot, at the media. The conventional HAMR head 10 may then use the heat at and/or around the spot to magnetically write to the media.

FIG. 3 depicts a conventional method 50 for forming the conventional ITWG 20. The bottom cladding layer 12, core layer 14 and top cladding layer 16 are deposited, via step 52. The ITWG pattern is then transferred to the waveguide layers 12, 14 and 16, via step 54. Typically, a mask that covers the arms 22 and 24, the tapered portion 26 and any remaining portions of the ITWG 20 is provided. The exposed portions of the top cladding layer 16 and core layer 14 are removed. A portion of the bottom cladding layer 12 might also be removed, for example by over etching the core layer 14. A trench is thus formed in the top cladding layer 16 and core layer 14. The ITWG 20 is thus defined. The areas surrounding the ITWG are refilled with a dielectric 18, via step 56. The top cladding 16, dielectric 18 and bottom cladding 12 layers may be formed of the same material. Thus, the boundaries between the layers 12, 16 and 18 are denoted by dashed lines and the dielectric 18 may be considered part of the top cladding layer 16. The ITWG 20 may thus be formed.

Although the conventional ITWG 20 and method 10 function, there are drawbacks. In particular, efficiency of the NFT may not be sufficient for operation of the conventional HAMR transducer 10. The ability of the NFT to adequately perform its functions depends upon a number of factors. The NFT parameters, such as the NFT shape, size and materials, influence NFT performance. Illumination parameters related to the energy input from the laser and directed by the ITWG 20 also affect NFT performance. The phase difference of the light arriving at the NFT from the arms 22 and 24 is one such parameter. Processing limitations may result in variations in the thickness, width, length, and/or to certain extent the refractive index of the conventional ITWG 20. Variations in the NFT-to-waveguide overlay and voids in the conventional ITWG 20 may also affect the optical path length and thus phase difference between the arms 22 and 24. Further, the laser diode wavelength and temperature variations of the conventional transducer 10 may also affect the phase difference between the arms 22 and 24. The ability of the conventional ITWG 20 to provide light having the target phase difference at the NFT may be adversely affected. If the light from the arms 22 and 24 does not have the target phase difference, the desired interference pattern may be shifted off of the NFT. Performance of the NFT and, therefore, the conventional HAMR transducer 10 may thus be hindered.

Accordingly, what is needed is an improved method for fabricating an ITWG in a HAMR transducer.

SUMMARY

A method fabricates an interferometric tapered waveguide (ITWG) for a heat-assisted magnetic recording (HAMR) transducer. The ITWG is defined from at least one waveguide layer. The waveguide layer(s) include an energy sensitive core layer. The energy sensitive core layer has an index of refraction that varies in response to exposure to energy having a particular wavelength range. The step of defining the ITWG includes defining a plurality of arms for the ITWG. At least one phase difference between the arms is determined. At least one of the arms is exposed to the energy such that the index of refraction of the energy sensitive core layer in the arm(s) is changed and such that the phase difference(s) between the arms is changed.

BRIEF DESCRIPTION OF SEVERAL VIEWS OF THE DRAWINGS

FIGS. 1-2 are diagrams depicting plan and side views of a conventional waveguide in a conventional magnetic transducer.

FIG. 3 is a flow chart depicting a conventional method for fabricating a side shield.

DETAILED DESCRIPTION OF THE PREFERRED EMBODIMENTS

Figure 4:
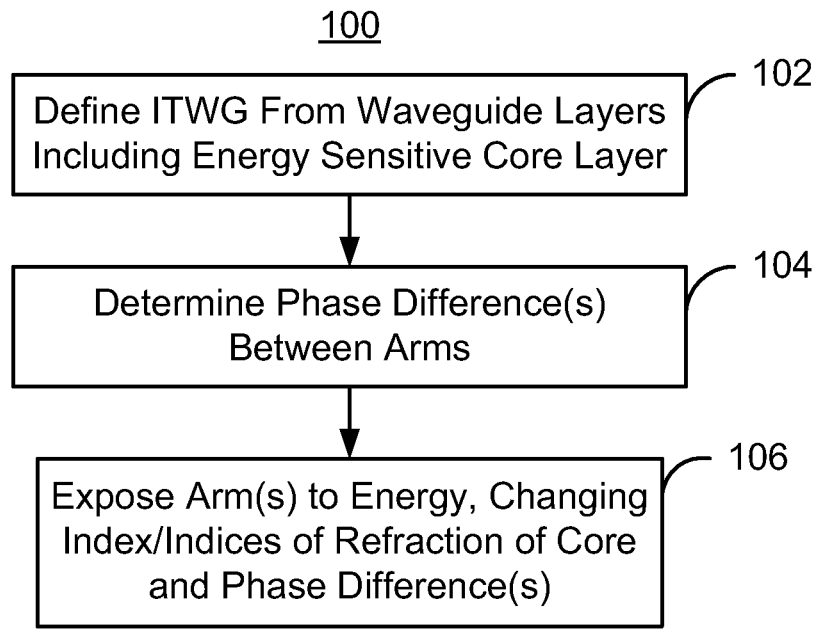
FIG. 4 is a flow chart depicting an exemplary embodiment of a method for fabricating an interferometric tapered waveguide for a magnetic recording transducer.

FIG. 4 is a flow chart depicting an exemplary embodiment of a method 100 for fabricating waveguides in heat assisted magnetic recording (HAMR) transducers. In particular, the method 100 may be used in fabricating an interferometric tapered waveguide (ITWG). For simplicity, some steps may be omitted, performed in another order, interleaved with other steps and/or combined. The magnetic recording transducer being fabricated may be part of a merged head that also includes a read head (not shown) and resides on a slider (not shown) in a disk drive. The method 100 is described in the context of forming a single transducer. However, the method 100 may be used to fabricate multiple transducers at substantially the same time. The method 100 and system are also described in the context of particular layers. However, in some embodiments, such layers may include multiple sub-layers.

The method 100 also may commence after formation of other portions of the magnetic recording transducer. For example, the method 100 may start after portions of the pole, a read transducer (if any) and/or other structures have been fabricated. Further, formation of other portions of the HAMR transducer may be interleaved with the method 100. The method 100 starts after the layers for the ITWG have been provided. For example, at least a first (e.g. bottom) cladding layer, at least one core layer, and at least a second (e.g. top) cladding layer are deposited. The top and/or bottom cladding layers may, for example, include aluminum oxide and/or silicon dioxide. In some embodiments, the top and bottom cladding layers consist of aluminum oxide. The indices of refraction of the top and bottom cladding layers are generally lower than the index of refraction of the core layer.

The ITWG is defined from the waveguide layers, via step 102. Defining the ITWG in step 102 includes defining the arms for the ITWG. The arms of the ITWG are designed based upon a target phase difference. More specifically, the optical lengths of the arms of the ITWG differ to provide the target phase difference between light traveling through the arms and meeting at the NFT. For an ITWG having a Y-splitter, step 102 includes defining the arms to form the Y-splitter. In embodiments including an MMI instead of a Y-splitter, step 102 also includes fabricating the MMI. Step 102 generally includes providing a mask covering the arms of the waveguide and etching through the at least some of layers for the waveguide. In addition, a refill step may also be performed. This refill step deposits a dielectric in the regions which were etched through. In some embodiments, the dielectric deposited is the same as the top cladding. Thus, the top cladding may be considered to contact the bottom cladding in the regions surrounding and between the arms of the ITWG.

As discussed above, the waveguide layers defined in step 102 include cladding and core layers. The core layer(s) include one or more energy sensitive core layers. An energy sensitive core layer has an index of refraction that varies in response to exposure to energy having a particular wavelength range. For example, in some embodiments, the energy sensitive core layer may include $Ta_2O_5$. In some embodiments, the energy sensitive core layer consists of $Ta_2O_5$. $Ta_2O_5$ is sensitive to light energy in the mid and deep ultraviolet range. Thus, an energy sensitive $Ta_2O_5$ layer has an index of refraction that varies in response to the application of light in the mid to deep ultraviolet range. However, the laser that is used in conjunction with the HAMR transducer provides light in another wavelength range. Consequently, operation of the HAMR transducer does not change the index of refraction of the energy sensitive core layer. For example, in some embodiments, the laser used with the HAMR disk drive provides light in the visible range. In other embodiments, an infrared or other laser light might be used. The wavelength range of the laser is desired not to overlap with the wavelength range to which the energy sensitive core layer is responsive.

After the ITWG is defined, the phase difference(s) between the arms of the ITWG is determined, via step 104. Step 104 may be performed at wafer level. At the wafer level, the phase differences within the wafer may be assumed to be the same. Thus, step 104 may determine wafer-to-wafer variations (sigma) in the phase difference between arms of the ITWG. Within wafer variations in the phase difference may also be determined. In some embodiments, discrepancies between flash fields on the wafer may be ascertained. For example, one or more test devices may be provided on each flash field of the wafer to determine the phase differences of the ITWG at various portions of the wafer. In some embodiments, data from the test devices may be extrapolated to provide determinations of the phase difference(s) in the arms of ITWGs on the wafer. However, in other embodiments, device(s) may be individually tested. In some embodiments, both within wafer sigma and wafer-to-wafer variations in the phase difference between the arms may be determined. Further, this determination may be made after the transducers have been diced into rpw bars. Thus, determinations may be made on a row bar-by-row bar basis. Thus, using step 104, variations between the actual phase difference(s) of fabricated ITWGs and the target phase difference(s) may be determined.

At least one of the arms of the ITWG is exposed to the energy that changes the index of refraction of the energy sensitive core layer, via step 106. In some embodiments, step 106 is also performed by providing a mask that is opaque to the energy to which the core layer is sensitive. For example, for some embodiments, Au, Cr and/or other metals that block light may be used for the mask. The mask also includes one or more apertures that leave a portion of one or more of the arms uncovered. In some embodiments, the mask covers all of the ITWG except for part of one arm. Such a mask can be incorporated into fabrication of the HAMR transducer. In some embodiments, an excimer laser, for example with a 193 nm or 248 nm wavelength, may be used to provide the energy to which the ITWG is exposed. Such an excimer laser may be employed because the output beam profile may be shaped and homogenized using high grade ultraviolet optics. Thus, a high intensity output (e.g. at least 500 mJ/cm$^2$) may be obtained for exposing a portion of an arm of the ITWG. In step 106, therefore, the excimer laser may simply be scanned across the wafer, while the mask prevents energy from the laser from reaching some portions of the ITWG and allows the energy from the laser to reach other portions of the ITWG. In other embodiments, row bars may be exposed to energy from the excimer laser.

One or more of the cladding layers is desired to be substantially transparent to the energy used in changing the index of refraction of the energy sensitive core layer. Thus, the energy to which the ITWG is exposed in step 106 is transmitted through the cladding layer(s) to the energy sensitive core layer in the arm(s). The index of refraction of the energy sensitive core layer in the arm(s) is thereby changed in step 106. The dosage of energy used in step 106 depends upon the phase difference determined in step 104. The further away the phase difference is from the target phase difference, the higher the dosage and the more the index of refraction of the core layer may be changed.

Exposure of the arm(s) of the ITWG to the energy in step 106 changes the index of refraction in the arm(s) and alters the optical path for the arm(s). A reduction in the index of refraction shortens the optical path of the arm, while an increase in the index of refraction lengthens the optical path of the arm. Because the optical path changes through step 106, the phase difference(s) between the arms changes. In some embodiments, a portion of only one arm of the ITWG is exposed to the energy in step 106. The change in the index of refraction of a portion of the arm translates to a change in the optical path for that arm. The optical path(s) for the arm(s) that are covered remain unchanged. Thus, the phase difference between arms may be increased or decreased. Fabrication of the ITWG may then be completed.

Figure 5:
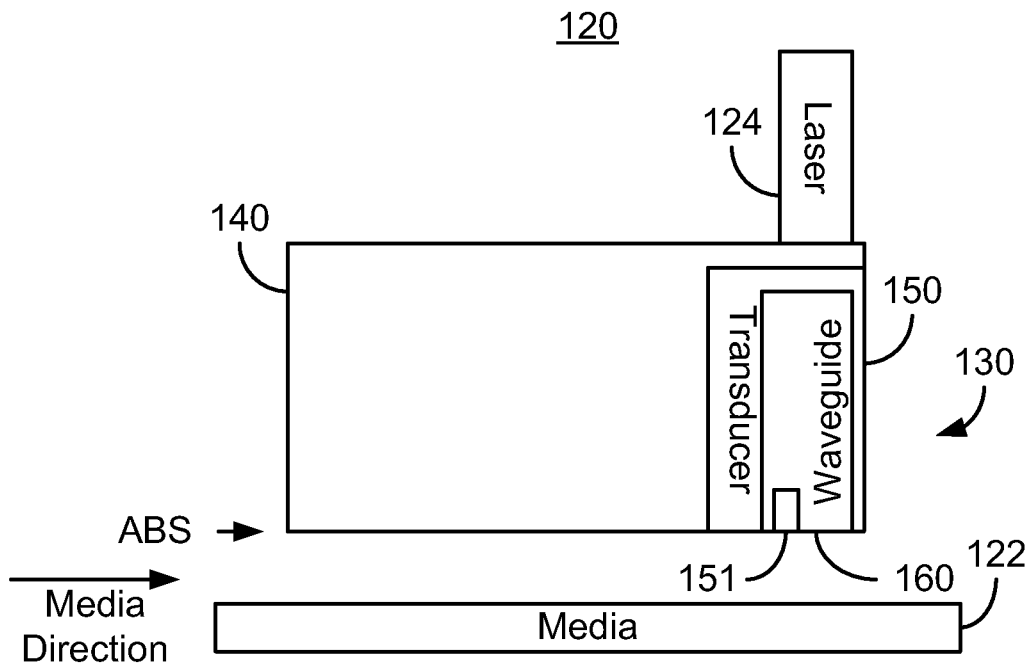
FIG. 5 is a diagram depicting a disk drive including a heat assisted magnetic recording transducer.

In some embodiments, the phase difference between the arms may be altered to be closer to the target phase difference. For example, if a material such as $Ta_2O_5$ is used for the energy sensitive core layer, the index of refraction of the energy sensitive core is reduced by exposure to the energy. One arm may be designed with an optical path that is longer than what would be the target optical path for that arm. As a result, a lag between the light in that arm and light in the remaining arm(s) may be greater than the target. Thus, the arms may have a phase difference that is higher than the target phase difference, even with processing variations. The arm having the longer optical path may be exposed to the energy in step 106, reducing the index of refraction of a portion of the arm. The phase difference may thus be lowered. In some embodiments, the phase difference may be reduced to be at or near the target phase difference. If the index of refraction of the energy sensitive core layer increases upon exposure to the energy, then the optical path length of one arm may be designed to have an optical length that is shorter than a target optical length would be. Exposing a portion of that arm what would increase the index of refraction of that arm and, therefore, increase the optical path length. Again, the phase difference would be altered to be closer to the target phase difference FIG. 5 is a diagram depicting a portion of an HAMR disk drive 120 fabricated using the method 100. For clarity, FIG. 5 is not to scale. For simplicity not all portions of the HAMR disk drive 100 are shown. In addition, although the disk drive 100 is depicted in the context of particular components other and/or different components may be used. Further, the arrangement of components may vary in different embodiments. The HAMR disk drive 120 includes a slider 140, a laser/light source 124, media 122, and a HAMR head 130. In some embodiments, the laser 124 is a laser diode. The laser 124 is used in operation of the HAMR disk drive 120, not in the method 100. Although shown as mounted on the slider 140, the laser 124 may be coupled with the slider 140 in another fashion. For example, the laser 124 might be mounted on a suspension (not shown in FIG. 5) to which the slider 140 is also attached. The laser 124 may also be oriented differently and/or optically coupled with the HAMR transducer 150 in another manner. The media 122 may include multiple layers, which are not shown in FIG. 2 for simplicity.

The HAMR head 130 includes an HAMR transducer 150. The HAMR head 130 may also include a read transducer (not shown in FIG. 5). The read transducer may be included if the HAMR head 130 is a merged head. The HAMR transducer 150 includes an NFT 151 and at least one waveguide 160. The HAMR transducer 150 also typically includes a pole, shield (s), coil(s) and other components for magnetically writing to the media 122. The waveguide 160 is an ITWG manufactured using the method 100.

Figure 6:
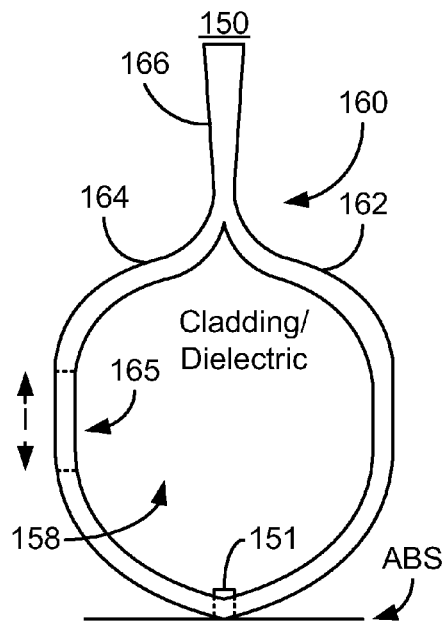
FIGS. 6-7 are diagrams depicting plan and side view an exemplary embodiment a heat assisted magnetic recording transducer.
Figure 7:
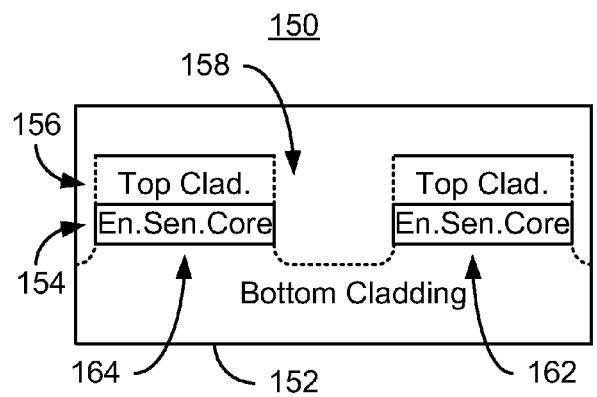

FIGS. 6-7 are diagrams depicting top and side views of an exemplary embodiment of a portion of a HAMR transducer 150 having a structure formed using the method 100. For clarity, FIGS. 6-7 are not to scale. The HAMR transducer 150 may be part of a merged head that includes at least one read transducer (not shown) in addition to one or more magnetic transducer(s) 150. Referring to FIGS. 5-7, the ITWG 160 and NFT 151 are shown. The ITWG 160 includes arms 162 and 164 as well as a tapered region 166. The arms 162 and 164 of the ITWG have a different optical path length. Thus, the light arriving at the NFT 151 from the arms 162 and 164 may have a phase difference. The ITWG is also made up of multiple layers 152, 154 and 156/158. More specifically, the ITWG includes a bottom cladding layer 152, the energy sensitive core layer 154 and a top cladding layer 156. The layers 152, 154 and 156 are deposited first, and then the ITWG 160 defined. The layer 158 may be provided during the refill portion of step 102. Because they may be made of the same material, the layers 156 and 158 may be considered the top cladding.

As can be seen in FIG. 6, a length, l, of the arm 164 has been exposed to energy that changes the index of refraction of the energy sensitive core. Thus, the portion 165 of the arm 164 has a different index of refraction than at least part of the remaining portion of the arm 164. In some embodiments, the region 165 has a different index of refraction than all of the remaining portions of the ITWG 160. For a $Ta_2O_5$ energy sensitive core layer 154, the region 165 may have a lower index of refraction than the $Ta_2O_5$ outside of the region 165. In other embodiments, the region 165 may have a higher index of refraction than other portions of the energy sensitive core layers 154.

Using the method 100, the ITWG 160 has been fabricated. The phase difference in light arriving at the NFT 151 from the arms 162 and 164 can be determined and compared to a target phase difference. The phase difference may also be changed and corrected by changing the index of refraction of the energy sensitive core layer 154. As a result, the phase difference between the arms 162 and 164 may be closer to the desired, target phase difference. This change in phase difference may account for variations in fabrication of the ITWG 150 including variations in the index of refraction, thickness, and length of the arms 162 and 164, variations in the wavelength of light produced by the laser 124 and/or other variations in the disk drive 120. More specifically, the index of refraction change in the region 165 is may be desired to be sufficiently large to account for all variations in the phase difference due to fabrication of the HAMR transducer 150. As a result, the optical properties of light provided to the NFT 151 may be at or closer to those desired. Consequently, performance of the NFT 151, and thus the HAMR transducer 150, may be improved.

Figure 8:
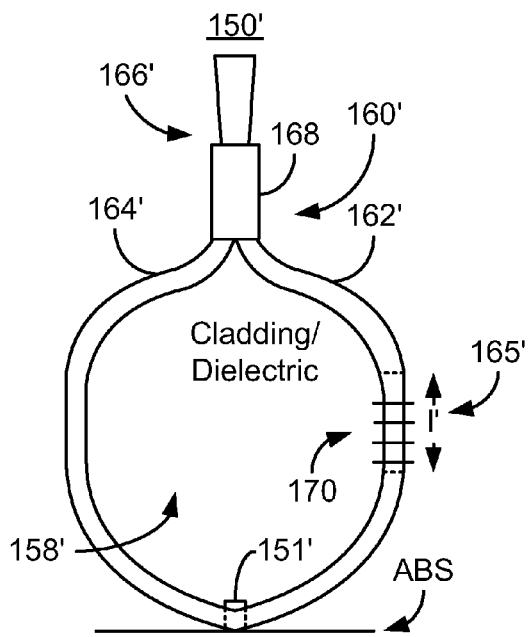
FIG. 8 is a diagram depicting another exemplary embodiment of a heat assisted magnetic recording transducer.

FIG. 8 is a diagram depicting a top view of an exemplary embodiment of a portion of a HAMR transducer 150' having an ITWG 160' formed using the method 100. For clarity, FIG. 8 is not to scale. Portions of the HAMR transducer 150' are analogous to the HAMR transducer 150 and thus are labeled similarly. The HAMR transducer 150' thus includes an NFT 151' and an ITWG 160' having arms 162' and 164' that are analogous to the NFT 151 and the ITWG 160 having arms 162 and 164. The ITWG 160' also includes waveguide layers analogous to layers 152, 154, 156 and 158, of which only part of the top cladding layer 158' is shown in FIG. 8.

The ITWG 160' also includes an MMI device 168 in place of the Y-splitter shown in the ITWG 160 of FIG. 6. In other embodiments, the ITWG 160' may use a Y-splitter. The arm 162' also includes a grating 170 that is incorporated into the optical path of the arm 162'. Thus, the grating 170 changes the optical path length of the arm 162'.

In the embodiment shown, the length l' of the arm 162' has been exposed to the energy that changes the index of refraction of the energy sensitive core layer. As a result, the region 165' may have a different index of refraction than other portions of the ITWG 160'. In some embodiments, the index of refraction of the region 165' is lower than some or all of the remaining portions of the ITWG 160'. In other embodiments, the index of refraction of the region 165' is greater than some or all of the remaining portions of the ITWG 160'. The optical path length of the arm 162' has thus been changed using the method 100. In the embodiment shown in FIG. 8, the region 165' includes the grating 170. Thus, the index of refraction of portions of the grating 165' and the optical path length for the grating 165' have been changed. In other embodiments, the region 165' may not include the grating 170' and/or may be part of another portion of the ITWG 160', such as the arm 164'.

Using the method 100, the ITWG 160' has been fabricated. The phase difference in light arriving at the NFT 151' from the arms 162' and 164' can be determined and compared to a target phase difference. The phase difference may also be changed and corrected by changing the index of refraction of the energy sensitive core layer 154'. As a result, the phase difference between the arms 162' and 164' may be closer to the desired, target phase difference. This phase difference change due to the change in the index of refraction of the region 165' may account for all processing variations in the phase difference. As a result, the optical properties of light provided to the NFT 151' may be at or closer to those desired. Consequently, performance of the NFT 151' and the HAMR transducer 150' may be improved.

Figure 9:
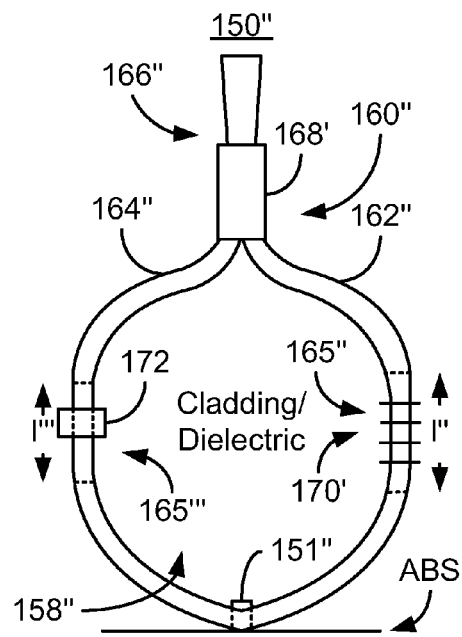
FIG. 9 is a diagram depicting another exemplary embodiment of a heat assisted magnetic recording transducer.

FIG. 9 is a diagram depicting a top view of an exemplary embodiment of a portion of a HAMR transducer 150' having an ITWG 160' formed using the method 100. For clarity, FIG. 9 is not to scale. Portions of the HAMR transducer 150" are analogous to the HAMR transducers 150 and 150' and thus are labeled similarly. The HAMR transducer 150" thus includes an NFT 151" and an ITWG 160" having arms 162" and 164" that are analogous to the NFT 151/151' and the ITWG 160/160' having arms 162/162' and 164/164'. The ITWG 160" also includes waveguide layers analogous to layers 152, 154, 156 and 158, of which only part of the top cladding layer 158" is shown in FIG. 9. The ITWG 160" is shown as including an MMI device 168' in place of the Y-splitter shown in the ITWG 160 of FIG. 6. In other embodiments, the ITWG 160" may use a Y-splitter. The arm 162" also includes a grating 170' that is analogous to the grating 170. However in other embodiments, the grating 170' could be on the arm 164" or omitted.

In addition, the ITWG 160" includes a trench that is incorporated into the optical path of the arm 164". The trench 172 changes the optical path length of the arm 164". In some respects, therefore, the trench 172 functions in an analogous manner to the grating 170.

In the embodiment shown, the length l" of the arm 162" has been exposed to the energy that changes the index of refraction of the energy sensitive core layer. Similarly, the length l'" of the arm 164" has been exposed to the energy that changes the index of refraction of the energy sensitive core layer. In the embodiment shown in FIG. 9, therefore, both arms 162" and 164" have regions that are exposed to the energy that changes the index of refraction of the core. However, in other embodiments, the region 165" or 165'" may be omitted. In addition, in the embodiment shown in FIG. 9, the regions 165" and 165'" include the grating 170' and the trench 172. However, in other embodiments, the regions 165" and/or 165'" may not include the grating 170' and trench 172. As a result, the regions 165" and 165'" each may have a different index of refraction than other portions of the ITWG 160". In some embodiments, the index of refraction of the regions 165" and 165'" are lower than some or all of the remaining portions of the ITWG 160". In other embodiments, the indices of refraction of the regions 165" and 165'" are greater than some or all of the remaining portions of the ITWG 160". In some embodiments, for example in which the energy sensitive core layer has an index of refraction that may increase or decrease depending upon the energy used or in which different core materials are used, the index of refraction of one region 165" may change in a different manner than the index of refraction of the other region 165'". For example, the index of refraction of the region 165" may increase while the index of refraction of the region 165'" may decrease or vice versa. The magnitude of the change of the index of refraction of one region 165" may be different than the magnitude of the change of the index of refraction of the other region 165'". For example, the reduction in the index of refraction of the region 165" may be greater than the reduction in the index of refraction of the region 165'". This may occur where one region 165" receives a greater dose of the energy than the other region 165'". The optical path length(s) of the arm(s) 162" and/or 164" My thus be changed using the method 100.

The ITWG 160" has been fabricated using the method 100. The phase difference in light arriving at the NFT 151" from the arms 162" and 164" can be determined and compared to a target phase difference. The phase difference may also be changed and corrected by changing the index of refraction of the energy sensitive core layer 154". This phase difference change due to the change in the index of refraction of the region 165" and/or 165'" may account for all processing variations in the phase difference between the arms 162" and 164". The phase difference between the arms 162" and 164" may be closer to the desired, target phase difference at the NFT 151". As a result, the optical properties of light provided to the NFT 151" may be at or closer to those desired. Consequently, performance of the NFT 151" and the HAMR transducer 150' may be improved.

Figure 10:
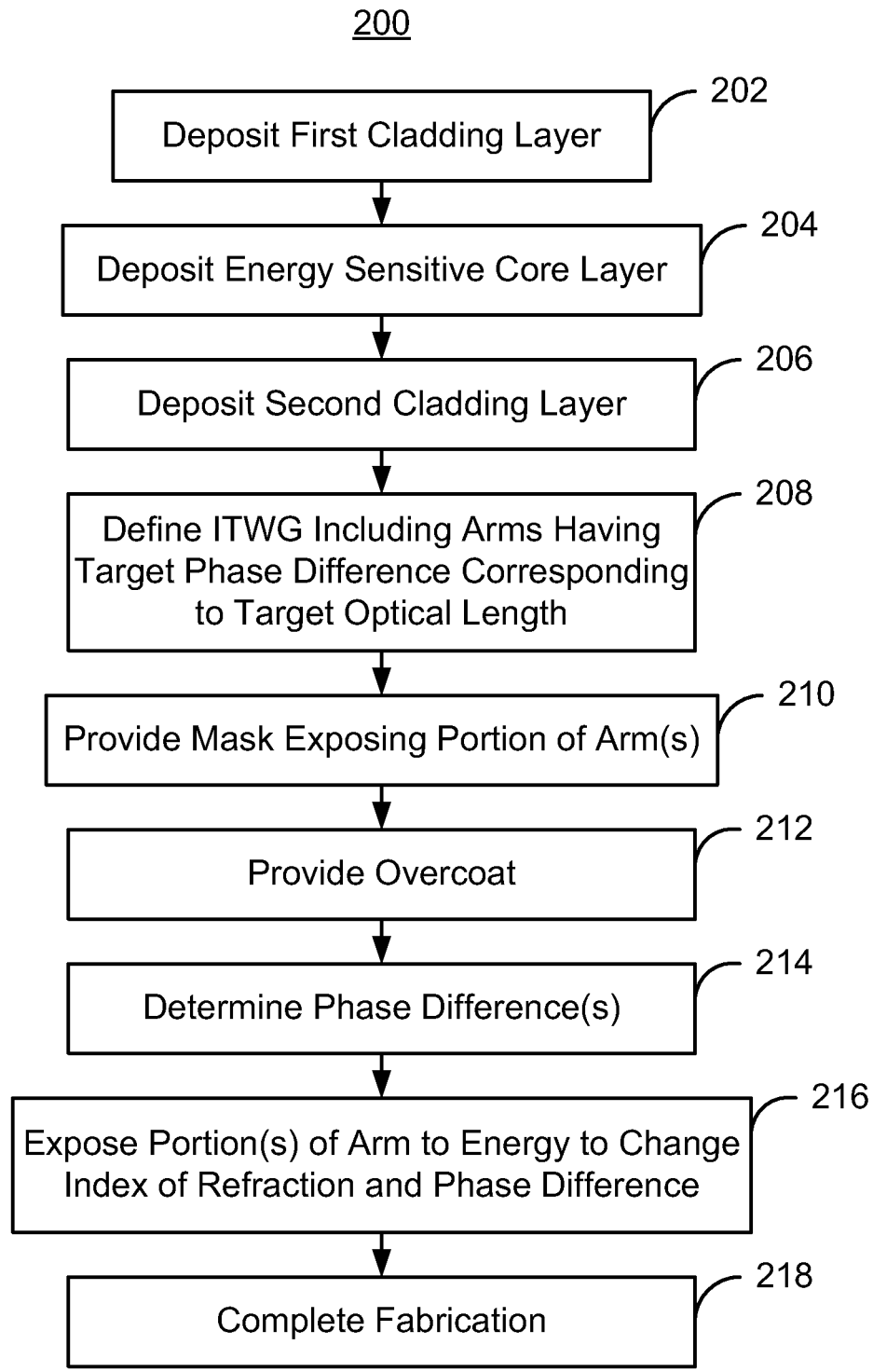
FIG. 10 is a flow chart depicting another exemplary embodiment of a method for fabricating a waveguide in magnetic recording transducer.

FIG. 10 is a flow chart depicting another exemplary embodiment of a method 200 for fabricating an ITWG in an HAMR transducer. For simplicity, some steps may be omitted. FIGS. 11-22 are diagrams depicting side and plan views of an exemplary embodiment of a portion of a transducer 250 during fabrication. For clarity, FIGS. 11-22 are not to scale. Referring to FIGS. 10-22, the method 200 is described in the context of the transducer 250. However, the method 200 may be used to form another device (not shown). The transducer 250 being fabricated may be part of a merged head that also includes a read head (not shown in FIGS. 11-22) and resides on a slider (not shown) in a disk drive. The method 200 also may commence after formation of other portions of the transducer 250. The method 200 is also described in the context of providing an ITWG having two arms in a single transducer 250. However, the method 200 may be used to fabricate multiple ITWGs, another number of arms and/or multiple transducers at substantially the same time. The method 200 and device 250 are also described in the context of particular layers. However, in some embodiments, such layers may include multiple sublayers. The method 200 also commences after formation of other portions of the magnetic recording transducer. For example, the method 200 may start after the portions of the pole, the read transducer and/or other structures have been provided.

A first cladding layer is deposited, via step 202. In some embodiments, the first cladding layer is an aluminum oxide layer and may be deposited using PVD. However, in other embodiments, additional and/or other materials including but not limited to $SiO_2$ might be used.

An energy sensitive core layer is deposited on the bottom cladding layer, via step 204. The energy sensitive core layer has an index of refraction that changes in response to exposure to energy having a particular wavelength range. In some embodiments, the energy sensitive core layer is $Ta_2O_5$ and may be deposited using PVD. In other embodiments, however, additional or other materials may be used.

A second cladding layer is deposited, via step 206. In some embodiments, the second cladding layer is an aluminum oxide layer and may be deposited using PVD. However, other and/or additional materials may be used. The second, or top, cladding layer is desired to be transparent or translucent to the wavelength range to which the energy sensitive core layer is responsive. Aluminum oxide is transparent to light in the mid to deep ultraviolet range to which $Ta_2O_5$ is sensitive. Thus, in some embodiments, at least the second (top) cladding layer is desired to consist of aluminum oxide. The first (bottom) cladding layer may thus also be desired to consist of aluminum oxide.

Figure 11:
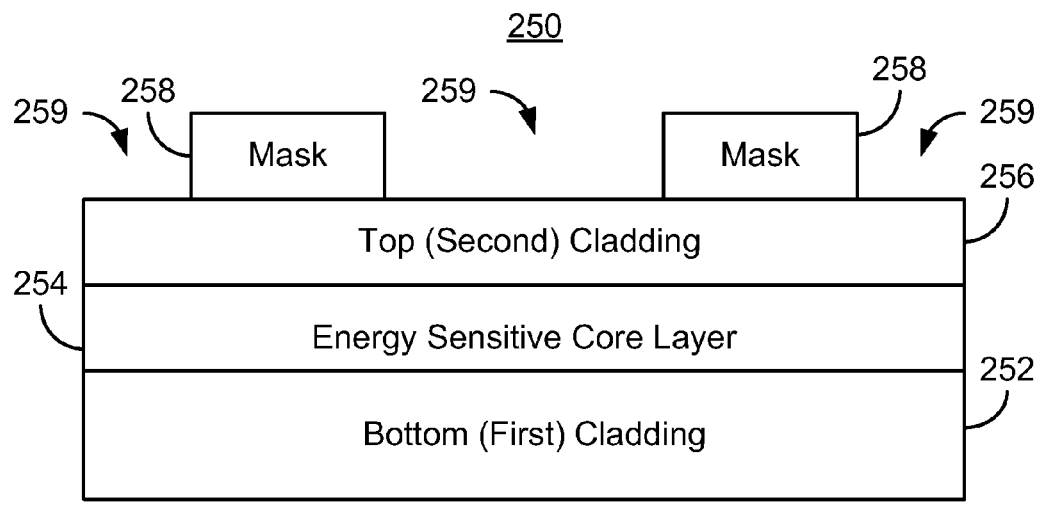
FIGS. 11-22 are diagrams depicting exemplary embodiments heat assisted magnetic recording transducers during fabrication.
Figure 12:
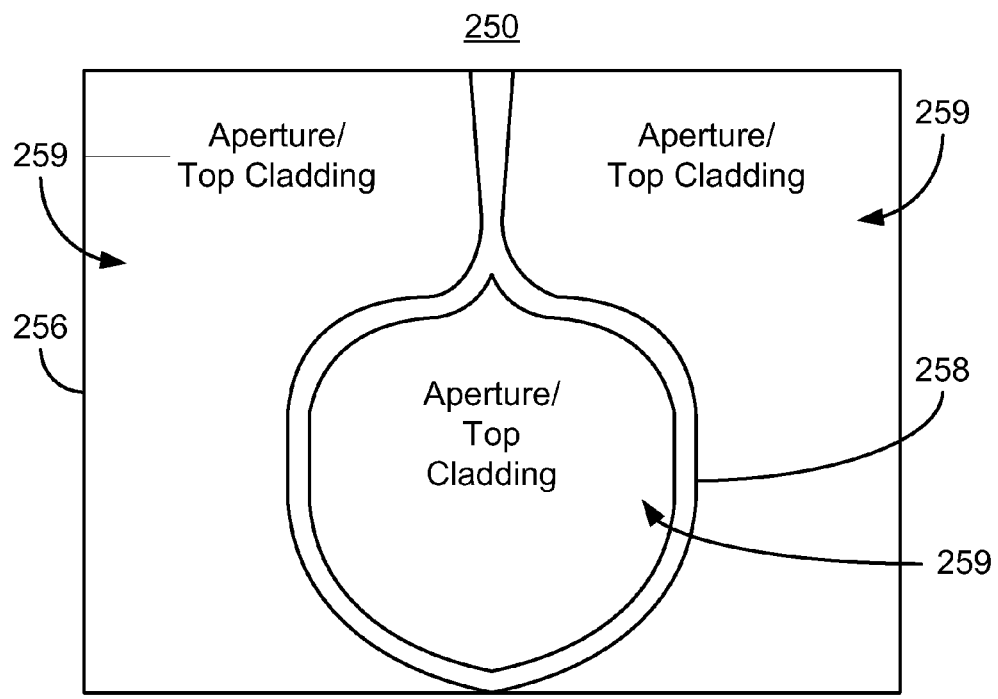
Figure 13:
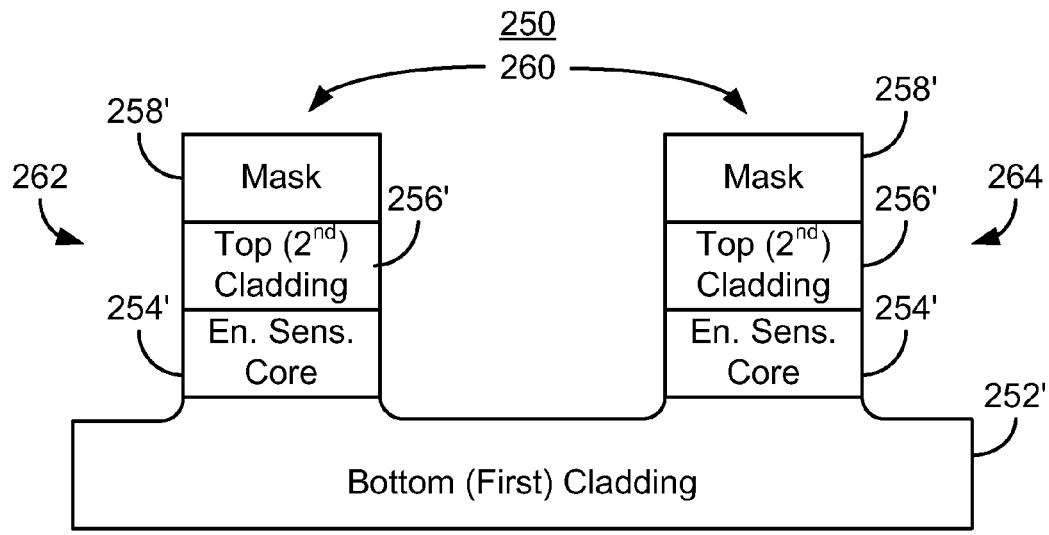
Figure 14:
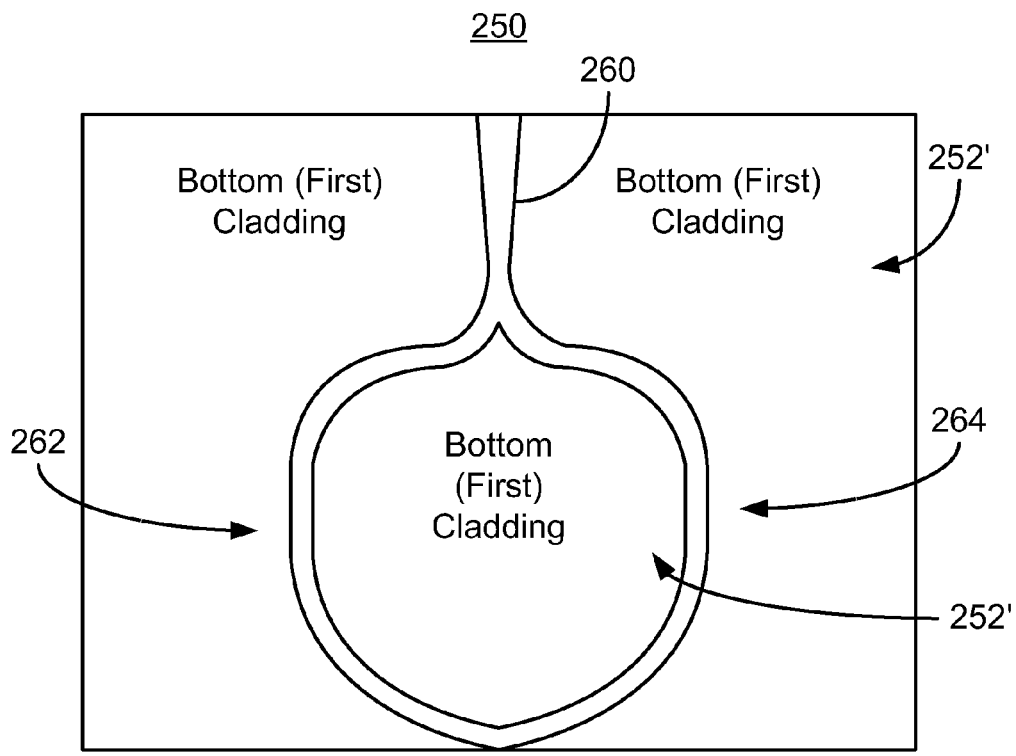
Figure 15:
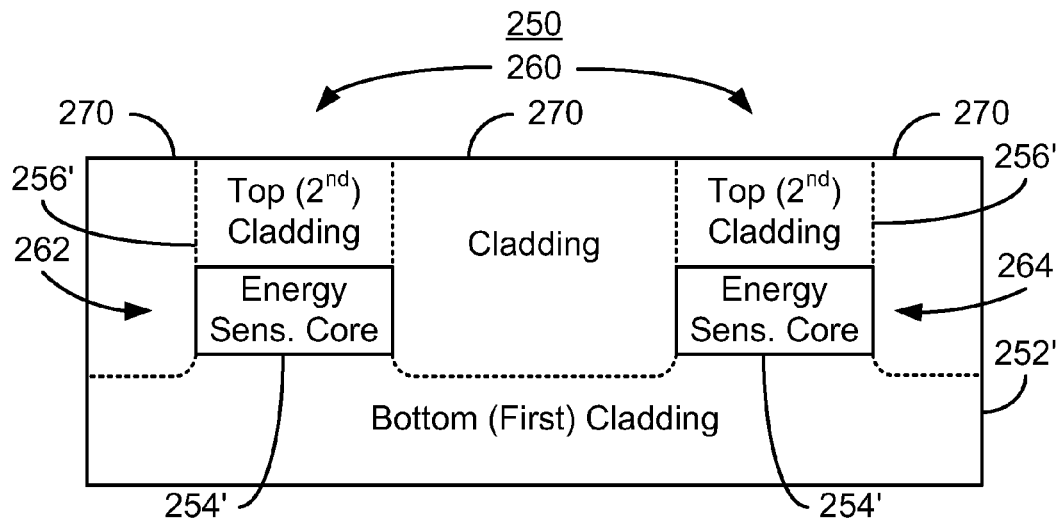
Figure 16:
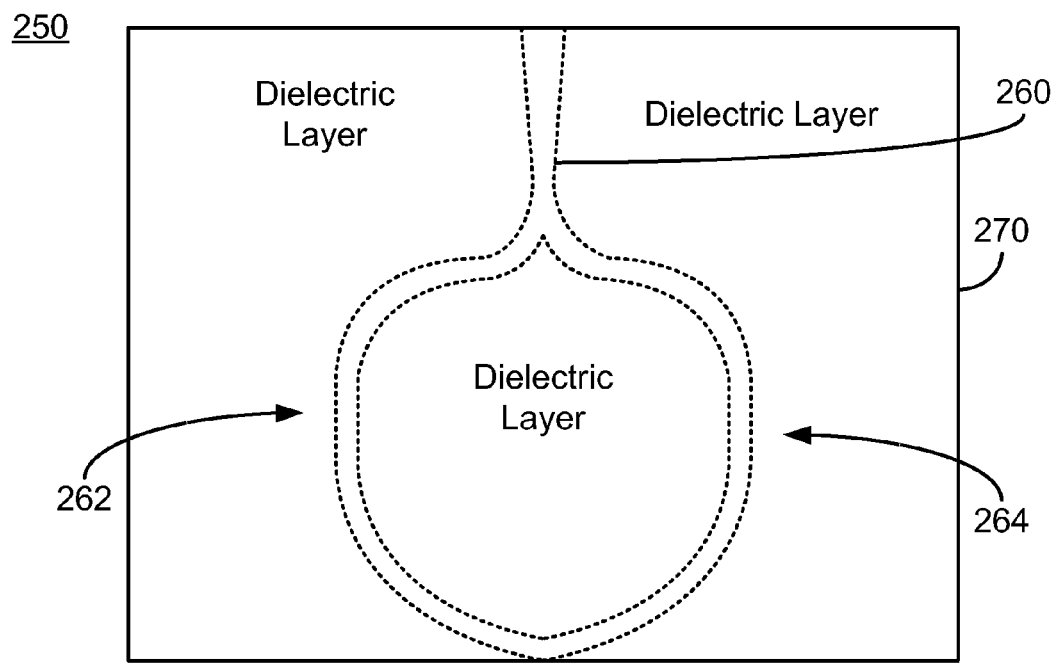

Portions of at least the energy sensitive core and second cladding layers are removed to define the ITWG including the arms of the ITWG, via step 208. In addition, a refill step and planarization may also be performed as part of step 208. In general, a portion of the first cladding layer is also removed by over-etching in order to ensure that all of the energy sensitive core material in the desired region is removed. FIGS. 11 and 12 depict side and top views, respectively, of the transducer 250 during step 208. Thus, bottom cladding layer 252, energy sensitive core layer 254 and top cladding layer 256 have been deposited. In addition, a mask 258 having apertures 259 has been formed. The mask 258 covers the portion of the layers 252, 254 and 256 that will form the ITWG. The apertures 259 correspond to portions of the layers 252, 254 and 256 that will be removed in step 208. FIGS. 13 and 14 depict side and top views, respectively, of the transducer 250 after portions of the energy sensitive core layer 254 and second cladding layer 256 have been removed. Remaining portions of the layers 252', 254' and 256' form the ITWG 260 including the arms 262 and 264. The energy sensitive core 254' under mask 258' corresponds to the two arms 262 and 264 of the ITWG 260 being formed. In addition, the arms 262 and 264 are configured to have different optical lengths. For example, the physical length, width and/or thickness of the energy sensitive core layer 254' differs for the arms 262 and 264. In the embodiment shown, the ITWG 260 has a Y-splitter and no trenches, gratings and/or other structures therein. However, in other embodiments, other devices including but not limited to an MMI, one or more trenches and one or more gratings may be provided as part of steps 202, 204, 206 and 208. FIGS. 15 and 16 depict side and top views, respectively, of the transducer 250 after step 208 has been completed. Thus, the cladding 270 has been deposited. The cladding 270 may be formed of the same material as the second (top) cladding layer 256' to allow for the energy to which the energy sensitive core layer 256' is responsive to be transmitted by the cladding layer 270. Thus, the cladding 256' and 270 might be considered to be the top/second cladding layer for the waveguide 260.

The arm 262 and/or 264 may be designed to have a different optical path length(s) than would be used for the target phase difference. For example, suppose the phase difference between the arms is desired to be within a target phase difference range. If the index of refraction of the energy sensitive core layer 254' can be reduced upon exposure to a particular energy range, then the arms 262 and/or 264 may be designed such that even with processing and other variations, the actual phase difference between the arms 262 and 264 is greater than or equal to the smallest angle in the target phase difference range. If the actual phase difference is outside of the target phase difference range or simply higher than desired, then the index of refraction of the arms 262 and/or 264 may be adjusted. Thus, the actual phase difference may be brought within the desired target phase difference range. Similarly, if the index of refraction of the energy sensitive core layer 254' can be increased upon exposure to a particular energy range, then the arms 262 and/or 264 may be designed such that even with processing and other variations, the actual phase difference between the arms 262 and 264 is less than or equal to the largest angle in the target phase difference range. If the actual phase difference is outside of the target phase difference range or simply lower than desired, then the index of refraction of the arms 262 and/or 264 may be adjusted. Thus, the actual phase difference may be brought within the desired target phase difference range.

A mask is provided on the ITWG 260, via step 210. More specifically, the mask covers at least part of the arms 262 and 264. The mask is opaque to the energy to which the energy sensitive core layer 254' is sensitive and includes an aperture therein. An overcoat layer is also provided, via step 212. In some embodiments, the overcoat layer is transparent to the energy to which the energy sensitive core layer 254' is responsive. In some embodiments, step 210 is performed before step 212. In other embodiments, step 212 is performed before step 212.

Figure 17:
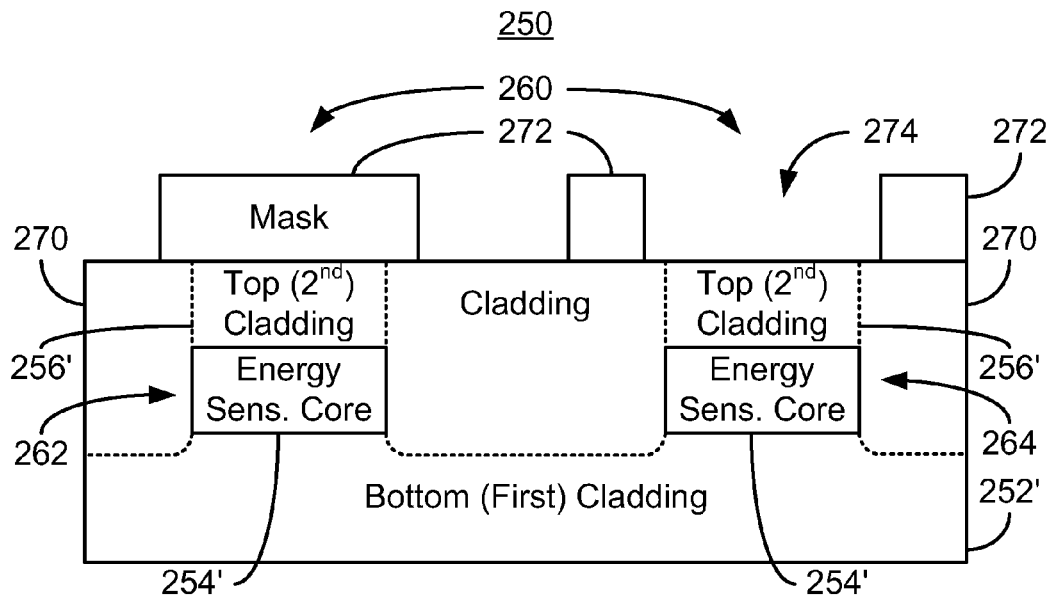
Figure 18:
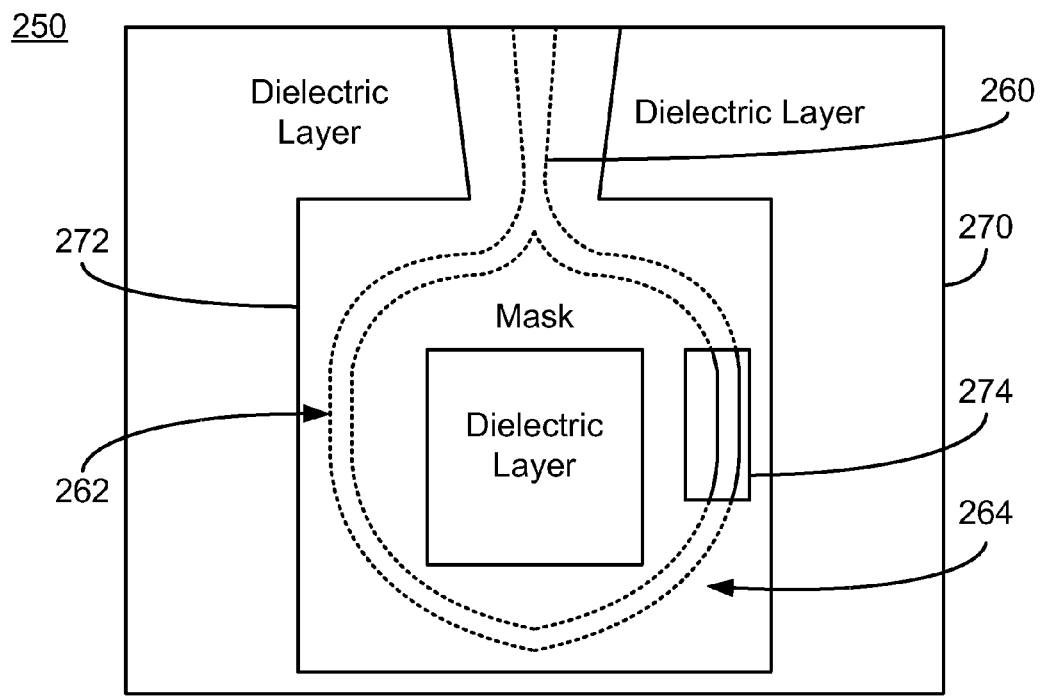
Figure 19:
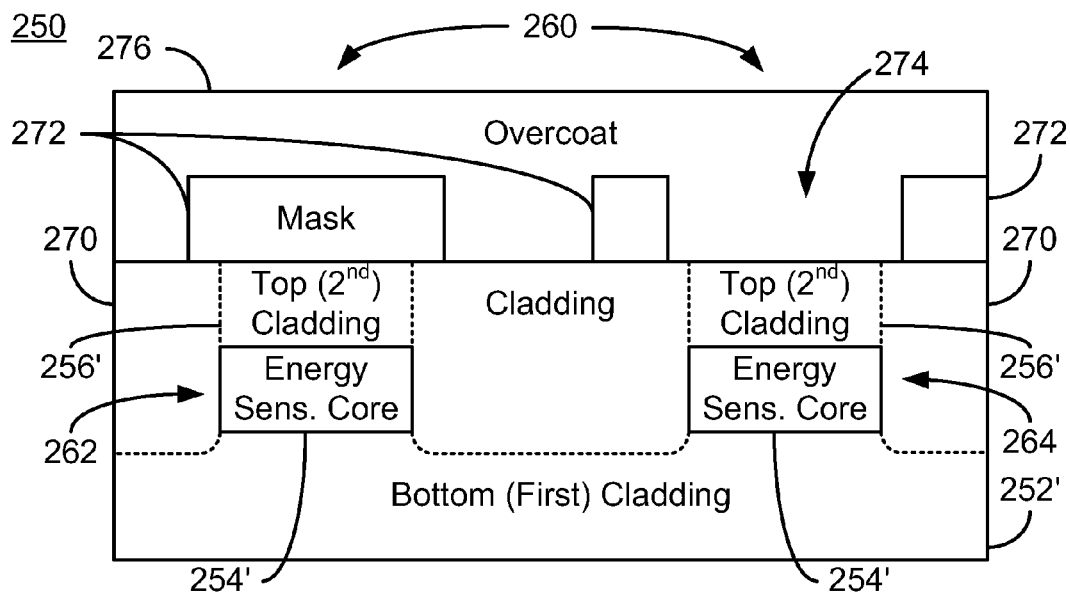
Figure 20:
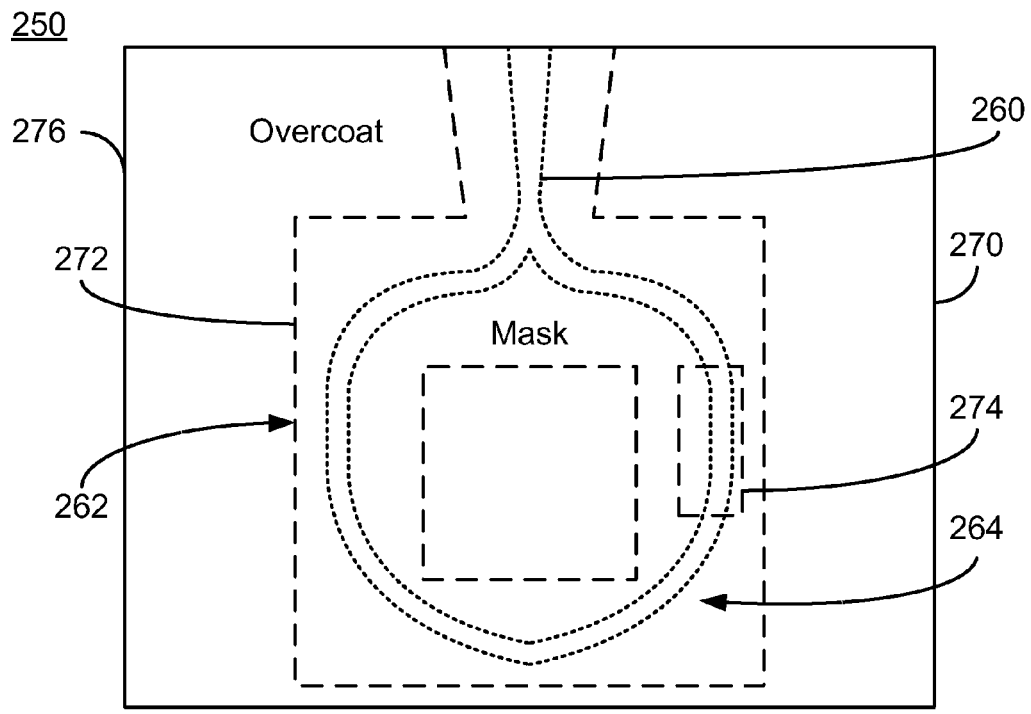
Figure 21:
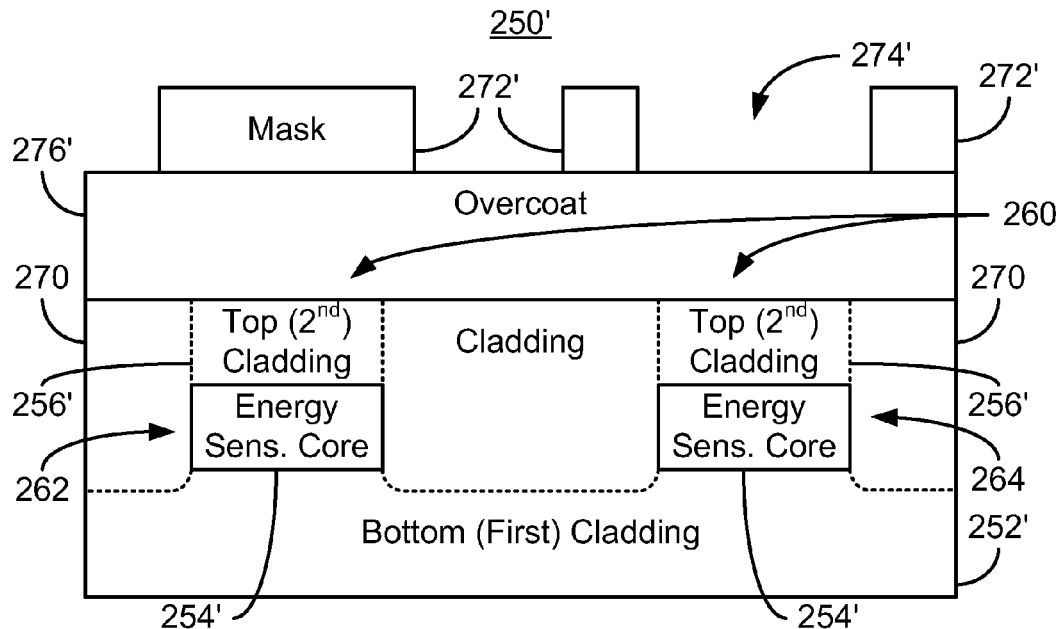
Figure 22:
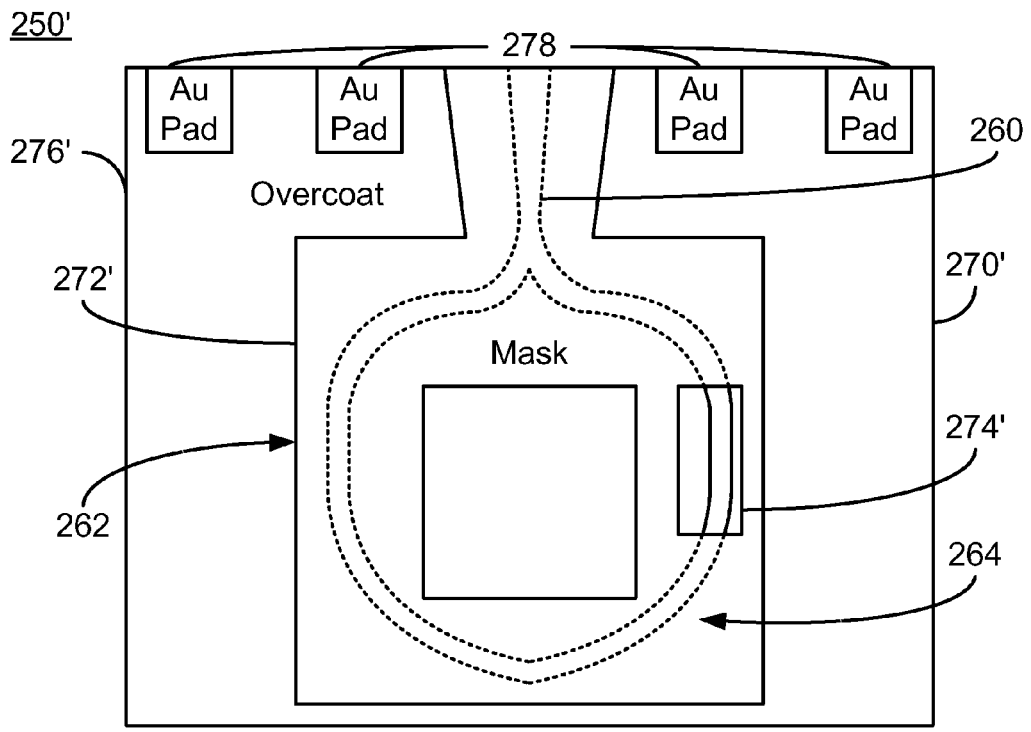

FIGS. 17-18 depict side and plan views of the transducer 250 after step 210 has been performed and for an embodiment in which step 212 is performed after step 210. Thus, the mask 272 is shown. The mask 272 includes an aperture 274. The portions of the ITWG 260 under the mask 272 are shown as a dashed line in FIG. 18. However, the portion of the arm 262 exposed by the aperture 274 is shown as a solid line. In the embodiment shown, only one aperture 274 exposing a part of one arm 264 is used. In another embodiment, another number of apertures, including one or more on the other arm 262 may be utilized. FIGS. 19 and 20 depict side and plan views of the transducer 250 after step 212 has been performed. Thus, an overcoat layer 276 is provided on the mask 272. FIGS. 21 and 22 depict side and plan views, respectively, of the transducer 250' in which step 210 is performed after step 212. Thus, the mask 272' resides on the overcoat layer 276'. The remaining components 252', 254', 256', 260, 262, 264 and 270 may remain substantially the same. In this embodiment, the mask 272' may be provided at the same time as pads 278. Thus, fabrication of the ITWG 260' may be simplified. Instead of utilizing a new mask for the mask 272, the mask for the pads 278 may be changed to incorporated the mask 272' having aperture 274'.

The phase difference between the arms 262 and 264 is determined, via step 214. Step 214 is analogous to step 104 of the method 100 and may be performed in a similar manner. Thus, the determination of the phase difference in step 214 may be performed at the wafer level, at the flash field level, and/or at the device level. In addition, the actual phase difference between the arms 262 and 264 may be compared with the target phase difference. As a result, variations of the phase difference between wafers and within wafer may be determined.

The portion of the arm uncovered by the aperture 274/274' is exposed to the energy to which the energy sensitive core layer 254' is responsive, via step 216. Thus, the index of refraction of the energy sensitive core layer 254' under the aperture 274/274' is changed. In embodiments in which $Ta_2O_5$ is used as the energy sensitive core layer 254', the index of refraction of the arm 264 may be reduced. The optical path length for the arm 264 is, therefore, changed. Consequently, the phase difference between the arm 264 and the arm 262 is changed. Fabrication of the HAMR transducer 250 may then be completed, via step 218.

Using the method 200, the ITWG 260 has been formed. Further, processing and other variations in the phase difference may be accounted for using the method 200. For example, in embodiments in which $Ta_2O_5$ is used for the energy sensitive core layer 254', the arm 264 may be designed to have a longer optical path length than would be used for the target phase difference. Suppose, for example, the target phase difference is 180°±20° for light from the arms 262 and 264 meeting at the NFT (not shown). The variation in the phase difference may be ±30° due to variations in the processing that result in deviations of the optical path lengths and/or other variations such as the laser light wavelength (not shown). In such an embodiment, the arm 264 may be designed to have a longer optical path length such that the designed phase difference is 195°. Given the sigma in the phase difference due to variations in processing, the actual phase difference between the arms 262 and 264 is 165°-225°. At the lower end of this range, the actual phase difference between the arms 262 and 264 is within the target range of 160°-200°. However, at the higher portions of the range of the actual phase difference)(200°-225° is outside of the target range. Thus, the portion of the arm 264 uncovered by the aperture 274/274' may be exposed to energy in the mid to deep ultraviolet range for ITWGs 250/250' that have an actual phase difference outside of the target range. As a result, the index of refraction of the portion of the arm 264 under the aperture 274/274' may be reduced to account for variations in the HAMR transducer 250/250'. The phase difference is thus lowered. In some embodiments, the phase difference may be brought to within the target range of 160°-200° and may be brought to substantially the target phase difference of 180°. Conversely, if the index of refraction of the core layer 254' is increased by exposure to energy, the arms 262 and 264 may be designed to have a smaller phase difference such that the largest phase difference (including variations) is within the target range. Adjustments may be made for ITWGs 260 having an actual phase difference that is lower than desired by increasing the index of refraction of the arm 264 exposed by the aperture 274/27'. Because the phase difference in light from the ITWG 260 may be corrected, the ITWG 260 may exhibit improved performance. As a result, the efficiency of the NFT (not shown) may be enhanced. Consequently, performance of the HAMR head 250 may be improved.

We claim:

1. A method for providing an interferometric tapered waveguide (ITWG) for a heat-assisted magnetic recording (HAMR) transducer comprising:

defining the ITWG from at least one waveguide layer, the at least one waveguide layer including an energy sensitive core layer, the energy sensitive core layer having an index of refraction that varies in response to exposure to energy having a particular wavelength range, the step of defining the ITWG including defining a plurality of arms for the ITWG;

determining at least one phase difference between the plurality of arms; and exposing at least one of the plurality of arms to the energy after the determining step such that the index of refraction of the energy sensitive core layer in the at least one of the plurality of arms is changed and such that the at least one phase difference between the plurality of arms is changed to at least one new phase difference, the at least one new phase difference being substantially constant during operation of the HAMR transducer and in-operation of the HAMR transducer, wherein the HAMR transducer is one of a plurality of HAMR transducers on a wafer and wherein the step of exposing the at least one of the plurality of arms to the energy is performed on a wafer level for the entire wafer.

2. The method of claim 1 further comprising:
providing the at least one waveguide layer.

3. The method of claim 1 further comprising:
providing a mask on the ITWG, the mask being opaque to the energy and including an aperture therein, the aperture exposing a portion of the at least one of the plurality of arms, covering a remaining portion of the at least one of the plurality of arms, and covering any remaining arms of the plurality of arms.

4. The method of claim 3 wherein the at least one waveguide layer includes a top cladding layer, step of providing the mask further including:
providing the mask on the top cladding layer.

5. The method of claim 4 wherein the HAMR transducer further includes an overcoat layer, the mask residing between the overcoat layer and the top cladding layer.

6. The method of claim 4 wherein the HAMR transducer further includes an overcoat layer, the overcoat layer residing between the mask and the top cladding layer.

7. The method of claim 1 wherein the step of exposing the at least one of the plurality of arms is performed on a device level.

8. The method of claim 1 wherein the ITWG has at least one target phase difference, the at least one target phase difference being constant, the at least one new phase difference being closer to the at least one target phase difference than the at least one phase difference.

9. The method of claim 1 wherein the HAMR transducer further includes at least one grating corresponding to at least a portion of the plurality of arms, the at least one grating contributing to the phase difference.

10. The method of claim 9 wherein the step of exposing the at least one of the plurality of arms further includes:
exposing at least a portion of the least one grating to the energy.

11. The method of claim 1 wherein the HAMR transducer further includes at least one trench corresponding to at least a portion of the plurality of arms, the at least one trench contributing to the phase difference.

12. The method of claim 11 wherein the step of exposing the at least one of the plurality of arms further includes:
exposing at least a portion of the at least one trench to the energy.

13. A method for providing an interferometric tapered waveguide (ITWG) for a heat-assisted magnetic recording (HAMR) transducer comprising:

defining the ITWG from at least one waveguide layer, the at least one waveguide layer including an energy sensitive core layer, the energy sensitive core layer having an index of refraction that varies in response to exposure to energy having a particular wavelength range, the step of defining the ITWG including defining a plurality of arms for the ITWG;

determining at least one phase difference between the plurality of arms; and exposing at least one of the plurality of arms to the energy after the determining step such that the index of refraction of the energy sensitive core layer in the at least one of the plurality of arms is changed and such that the at least one phase difference between the plurality of arms is changed to at least one new phase difference, the at least one new phase difference being substantially constant during operation of the HAMR transducer and in-operation of the HAMR transducer;

wherein the plurality of arms have a target phase difference, the target phase difference corresponding to a target optical length for one of the plurality of arms, and wherein the step of defining the ITWG further includes:

defining the one of the plurality of arms to have an optical length greater than the target optical length such that the at least one phase difference is greater than the target phase difference; and wherein the index of refraction of the energy sensitive core layer is reduced by exposure to the energy.

14. A method for providing an interferometric tapered waveguide (ITWG) for a heat-assisted magnetic recording (HAMR) transducer comprising:

defining the ITWG from at least one waveguide layer, the at least one waveguide layer including an enemy sensitive core layer, the energy sensitive core layer having an index of refraction that varies in response to exposure to energy having a particular wavelength range, the step of defining the ITWG including defining a plurality of arms for the ITWG;

determining at least one phase difference between the plurality of arms; and exposing at least one of the plurality of arms to the enemy after the determining step such that the index of refraction of the energy sensitive core layer in the at least one of the plurality of arms is changed and such that the at least one phase difference between the plurality of arms is changed to at least one new phase difference, the at least one new phase difference being substantially constant during operation of the HAMR transducer and in-operation of the HAMR transducer;

wherein the plurality of arms have a target phase difference, the target phase difference corresponding to a target optical length for one of the plurality of arms, and wherein the step of defining the ITWG further includes:

defining the one of the plurality of arms to have an optical length less than the target optical length such that the at least one phase difference is less than the target phase difference; and wherein the index of refraction of the energy sensitive core layer is increased by exposure to the energy.

15. A method for providing an interferometric tapered waveguide (ITWG) for an energy-assisted magnetic recording (HAMR) transducer, the method comprising:

providing a bottom cladding layer;

providing an energy sensitive core layer on the bottom cladding layer, the energy sensitive core layer having an index of refraction that decreases in response to exposure to energy having a particular wavelength range;

providing a top cladding layer on the energy sensitive core layer;

defining the ITWG including defining a plurality of arms for the ITWG, the ITWG having a target phase difference, the target phase difference corresponding to a target optical length for an arm of the plurality of arms, the arm of the plurality of arms having a longer optical length greater than the optical length such that the phase difference is greater than the target phase difference;

providing a mask on the plurality of arms, the mask being opaque to the energy and including an aperture therein, the aperture exposing a portion of the arm, covering a remaining portion of the arm, and covering any remaining arms of the plurality of arms;

determining at least one phase difference between the arm and the any remaining arms; and exposing the portion of the arm to the energy after the determining step such that the index of refraction of the energy sensitive core layer in the portion of the arm is reduced and such that the least one phase difference between the arm and the any remaining arms is changed to at least one new phase difference, the at least one new phase difference being substantially constant during operation of the HAMR transducer and in-operation of the HAMR transducer.

16. The method of claim 15 wherein the HAMR transducer further includes an overcoat layer, the mask residing between the overcoat layer and the top cladding layer.

17. The method of claim 15 wherein the HAMR transducer further includes an overcoat layer, the overcoat layer residing between the mask and the top cladding layer.

18. The method of claim 15 wherein the ITWG has at least one target phase difference, the at least one target phase difference being constant, the at least one new phase difference being closer to the at least one target phase difference than the at least one phase difference.

* * * * *